United States Patent
An et al.

(10) Patent No.: US 10,320,095 B2
(45) Date of Patent: Jun. 11, 2019

(54) EARTHING STRUCTURE OF EARTHING TRUCK

(71) Applicant: LSIS CO., LTD., Anyang-si, Gyeonggi-do (KR)

(72) Inventors: Kwanseung An, Anyang-si (KR); Jongdoo Kim, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/863,291

(22) Filed: Jan. 5, 2018

(65) Prior Publication Data
US 2018/0219307 A1 Aug. 2, 2018

(30) Foreign Application Priority Data
Jan. 31, 2017 (KR) .......................... 10-2017-0014033

(51) Int. Cl.
| | |
|---|---|
| H01R 4/66 | (2006.01) |
| H02B 1/16 | (2006.01) |
| H02B 1/20 | (2006.01) |
| H02B 11/28 | (2006.01) |

(52) U.S. Cl.
CPC ............... *H01R 4/66* (2013.01); *H02B 1/16* (2013.01); *H02B 1/20* (2013.01); *H02B 11/28* (2013.01)

(58) Field of Classification Search
None
See application file for complete search history.

(56) References Cited

U.S. PATENT DOCUMENTS

| | | | | |
|---|---|---|---|---|
| 1,797,936 | A * | 3/1931 | Auringer | H02B 11/24 361/607 |
| 3,793,494 | A * | 2/1974 | Cleaveland | H01H 33/666 200/50.22 |
| 5,450,280 | A * | 9/1995 | Wactor | H02B 11/167 174/51 |
| 9,787,067 | B2 * | 10/2017 | Park | H02B 11/133 |
| 2010/0208416 | A1 * | 8/2010 | Shoda | H02B 13/0354 361/606 |
| 2015/0318122 | A1 * | 11/2015 | Frye | H02B 1/04 235/382 |
| 2016/0036205 | A1 * | 2/2016 | Ricciuti | H02B 13/02 200/293 |

(Continued)

FOREIGN PATENT DOCUMENTS

| | | |
|---|---|---|
| CN | 1206943 A | 2/1999 |
| CN | 101488647 A | 7/2009 |

(Continued)

OTHER PUBLICATIONS

Chinese Office Action for related Chinese Application No. 201810072824.8; action dated Feb. 22, 2019; (7 pages).

*Primary Examiner* — Dimary S Lopez Cruz
(74) *Attorney, Agent, or Firm* — K&L Gates LLP (57) ABSTRACT

Provided is an earthing structure of an earthing truck that includes a frame with a terminal connection part and a moving part configured to support the frame and is configured to ground a bus or a cable while the moving part moves. The structure including: an earthing plate provided on a lower surface of the moving part; and an earthing member configured to provide a contact pressure to the earthing plate as it contacts the earthing plate when the moving part moves.

12 Claims, 11 Drawing Sheets

(56) References Cited

U.S. PATENT DOCUMENTS

2017/0271110 A1\* 9/2017 Zheng .................... H01H 33/04

FOREIGN PATENT DOCUMENTS

| | | |
|---|---|---|
| CN | 202333579 U | 7/2012 |
| CN | 203218777 U | 9/2013 |
| CN | 204144772 U | 2/2015 |
| CN | 204179556 U | 2/2015 |
| CN | 205583486 U | 9/2016 |
| JP | 06-026004 Y | 7/1994 |
| JP | 2012019650 A | 1/2012 |
| KR | 100396705 B1 | 8/2003 |
| KR | 20100094944 A | 8/2010 |
| KR | 101604281 B1 | 3/2016 |
| KR | 1020160121587 A | 10/2016 |

\* cited by examiner

EARTHING STRUCTURE OF EARTHING TRUCK

CROSS-REFERENCE TO RELATED APPLICATION

Pursuant to 35 U.S.C. § 119(a), this application claims the benefit of earlier filing date and right of priority to Korean Application No. 10-2017-0014033, filed on Jan. 31, 2017, the contents of which is incorporated by reference herein in its entirety.

BACKGROUND OF THE INVENTION

1. Field of the Invention

The present invention relates to an earthing structure of an earthing truck, and more particularly, to an earthing structure of an earthing truck, which simplifies the earthing structure for discharging a residual current in a bus chamber and a cable chamber of a distribution panel to the outside through the earthing truck, prevents the breakaway of the earthing truck, and also improves the earthing short-time capability.

2. Background of the Invention

In general, an earthing truck is a kind of earthing device that grounds the residual current on the load side or the bus side of a distribution panel to the earth to prevent safety accidents due to the residual current that can occur to an operator during repair or inspection of the load side equipment.

Figure 1:
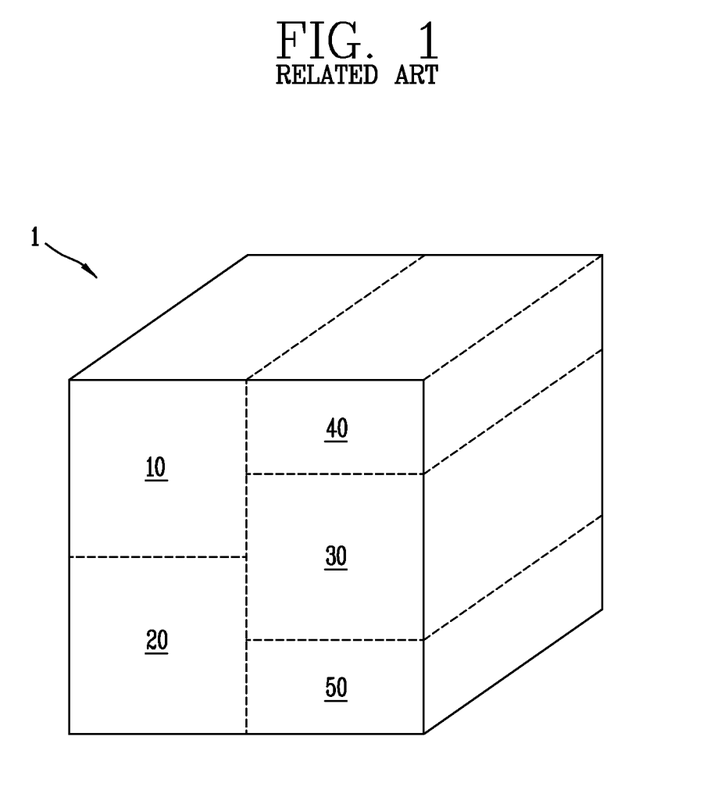
FIG. 1 is a perspective view showing a distribution panel including a conventional earthing truck.
Figure 2:
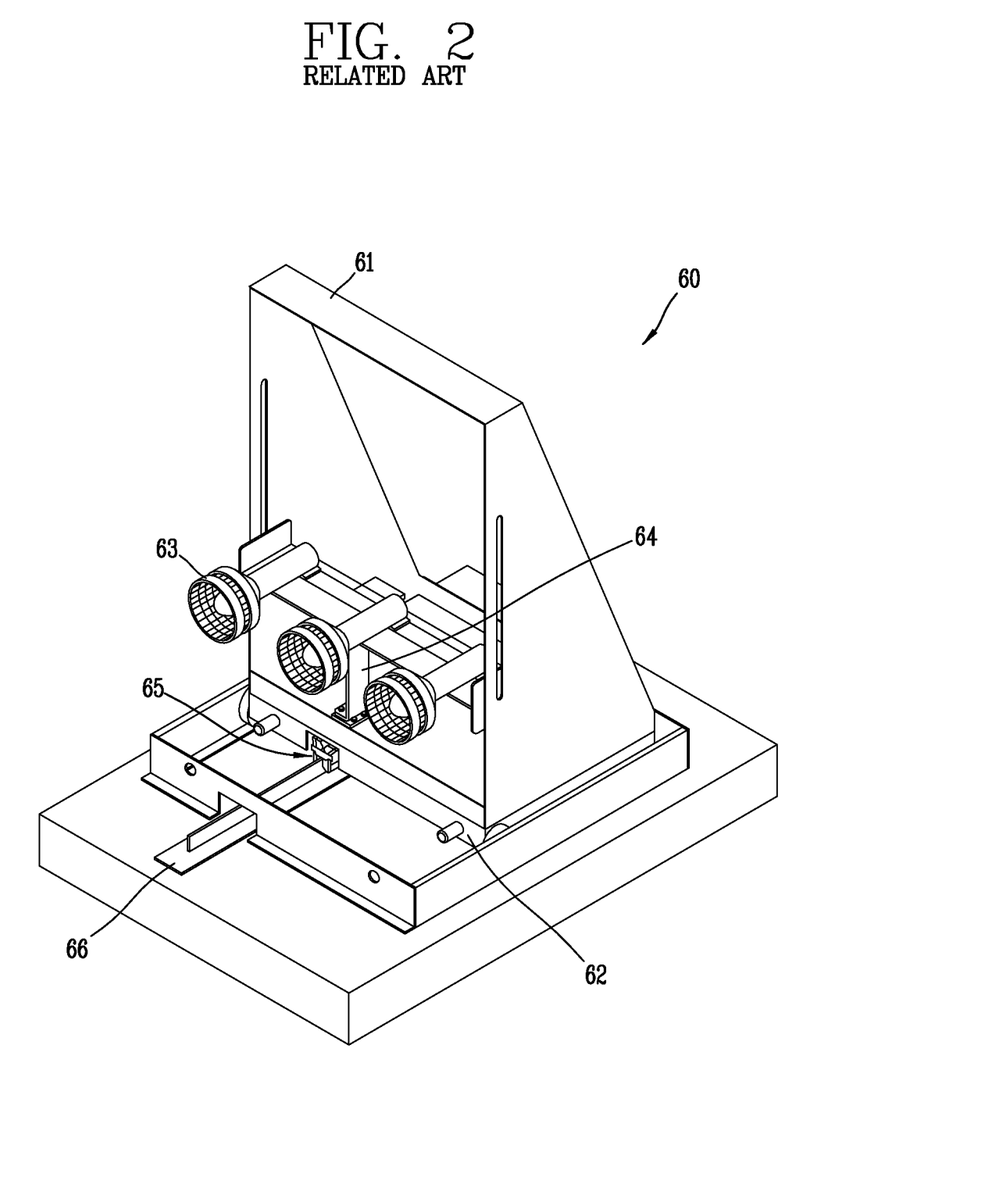
FIG. 2 is a perspective view showing a conventional earthing truck.

Moreover, FIG. 1 is a perspective view showing a distribution panel including a conventional earthing truck, and FIG. 2 is a perspective view showing a conventional earthing truck.

As shown in FIGS. 1 and 2, a distribution panel 1 with a conventional earthing truck includes a bus chamber 10, a cable chamber 20, a cutoff chamber 30, a Low Voltage (LV) chamber 40, and a Power Transfer (PT) chamber 50.

The cutoff chamber 30 is provided covering the bus chamber 10 and the cable chamber 20 and includes a breaker (not shown) that can electrically disconnect or connect the bus chamber 10 and the cable chamber 20, and the breaker provided in the cutoff chamber 30 may be drawn in and out.

The connection between the bus chamber 10 and the cable chamber 20 is cut off by the breaker's cutoff function so that power transmission from the bus chamber 10 to the cable chamber 20 or power transmission from the cable chamber 20 to the bus chamber 10 is blocked.

The bus chamber 10 receives high voltage power from a transmission line, and the cable chamber 20 receives high voltage power from the bus chamber 10 or low voltage power converted from high voltage power and supplies it to the load side through various paths.

The LV chamber 40 is a space in which a distribution panel control unit is mounted, and the PT chamber 50 is a space in which a PT for sensing a voltage is mounted.

In the conventional distribution panel 1 configured as described above, the earthing truck 60 grounds the residual current of the bus chamber 10 and the cable chamber 20 and discharges it to the outside while moving in the cutoff chamber 30. Such a conventional earthing truck 60 includes a frame 61, a moving part 62, a terminal connection part 63, a terminal connection bar 64, and a finger structure 65.

Therefore, as the earthing truck 60 moves, when the terminal connection part 63 is connected to a terminal connection part (not shown) provided in the bus chamber 10 or a terminal connection part (not shown) provided in the cable chamber 20, the residual current remaining in the bus chamber 10 or the cable chamber 20 is discharged to the outside through the terminal connection part 63, the terminal connection bar 64, the finger structure 65, and the guide member 66, so that the operator may work safely in the bus chamber 10 or cable chamber 20.

However, in relation to the above conventional earthing truck 60, since the finger structure 65 provided in the earthing truck 60 moves inside the cutoff chamber 30 while being inserted into the guide member 66, there is no additional force applied to fixedly support the earthing truck 60, so that there is a problem that the earthing truck 60 easily shakes or is easily detached from the moving path during the movement due to an external impact.

Furthermore, since the finger structures 65 and the like are provided in the earthing truck 60 rather than in the cutoff chamber 30 of the distribution panel 1, the structure of the earthing truck 60 is complicated, so that each component of the earthing truck 60 is easily damaged when moved.

SUMMARY OF THE INVENTION

Therefore, an aspect of the detailed description is to provide an earthing structure of an earthing truck, which simplifies the earthing structure for discharging a residual current in a bus chamber and a cable chamber of a distribution panel to the outside through the earthing truck, prevents the breakaway of the earthing truck, and also improves the earthing short-time capability.

To achieve these and other advantages and in accordance with the purpose of this specification, as embodied and broadly described herein, there is provided an earthing structure of an earthing truck that includes a frame with a terminal connection part and a moving part configured to support the frame and is configured to ground a bus or a cable while the moving part moves. The structure includes: an earthing plate provided on a lower surface of the moving part; and an earthing member configured to provide a contact pressure to the earthing plate as contacting the earthing plate when moving part moves.

The earthing member may be installed on a bottom surface of a distribution panel cutoff chamber.

The earthing member may include an earthing board configured to move downward through the earthing plate according to a movement of the moving part; and at least one elastic member positioned below the earthing board and configured to provide an elastic force upward when the earthing board moves downward to provide a contact pressure between the earthing plate and the earthing board.

The earthing board may be formed by stacking a plurality of copper boards.

The earthing board may compress the elastic member while bent downward as the earthing plate closely contacts according to a movement of the moving part and the earthing board may return to its original position through the elastic member when the close contact with the earthing plate is released according to a movement of the moving part.

The earthing board may include a contact board where the earthing plate closely contacts; and an inclined board formed inclined downward at both ends of the contact board and bent when the earthing plate closely contacts.

A connection board extending in a horizontal direction to be connected to a bus bar for earthing may be formed on the inclined board.

A breakage prevention member may be provided at an upper end of the contact board to prevent a breakage when the earthing plate and the earthing board contact; at least one earthing board connection hole for connection with the bus bar may be formed in the connection plate; and at least one bus bar connection hole may be formed in the bus bar to correspond to the earthing board connection hole. A fastening member may penetrate the earthing board connection hole and the bus bar to allow the earthing board and the bus bar to be interconnected.

A guide board formed inclined downward to contact the inclined board may be formed at one end of the breakage prevention member; and a round part may be formed between the breakage prevention member and the guide board.

A first fixing member for fixedly supporting the elastic member upward may be provided below the elastic member.

A second fixing member for fixedly supporting the elastic member downward may be provided on a lower surface of the contact board. A seating part positioned to contact one end of the elastic member and seated and an upper protrusion protruding upward from the seating part, to which one side of the elastic member is inserted and fixed, may be formed on the first fixing member; and a connection part positioned on a lower surface of the contact board and connected to the contact board and a lower protrusion protruding downward from the connection part, to which the other side of the elastic member is inserted and fixed, may be formed on the second fixing member.

The earthing structure may further include a terminal connection bar connected to the terminal connection part and the earthing plate to electrically connect the terminal connection part and the earthing plate.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, an earthing structure of an earthing truck according to an embodiment of the present invention will be described in detail with reference to the accompanying drawings.

Figure 3:
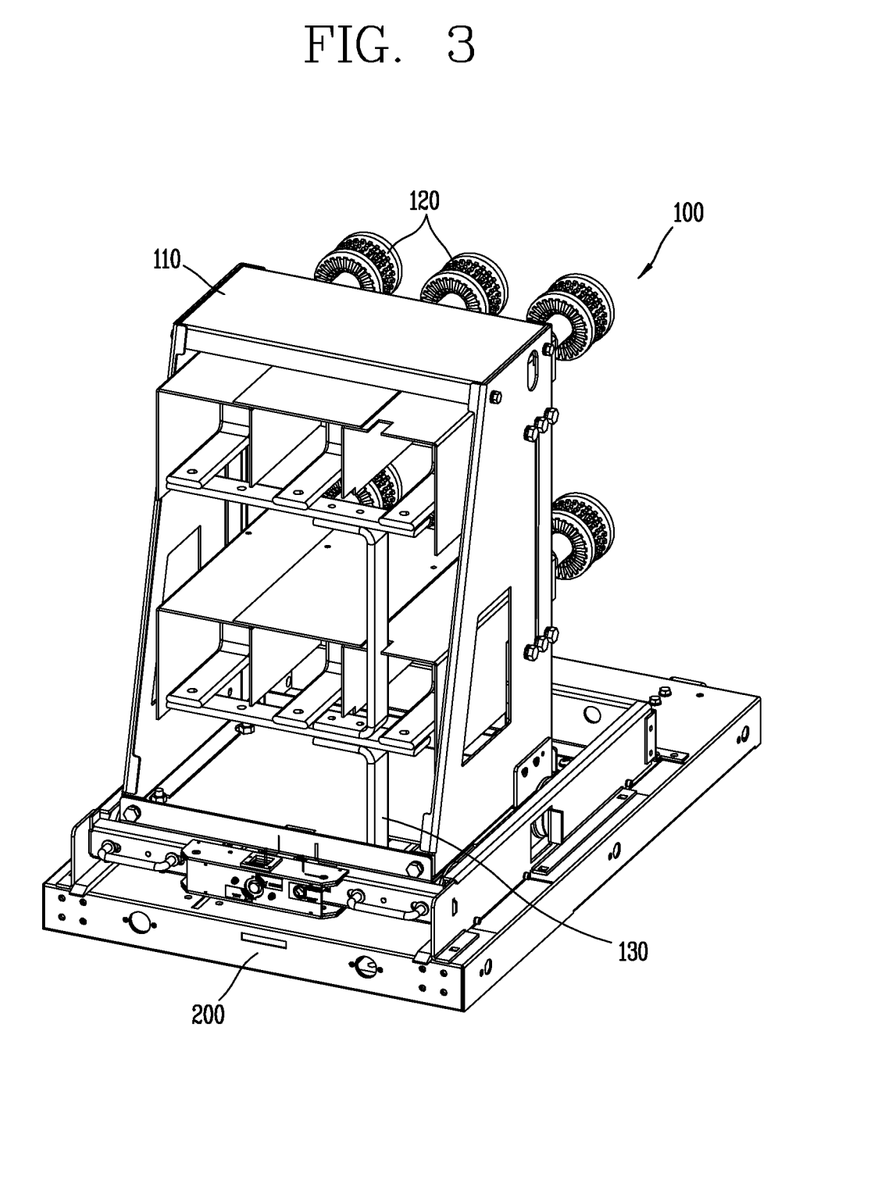
FIG. 3 is a perspective view showing a state in which an earthing truck according to the present invention is provided in a cutoff chamber.
Figure 4:
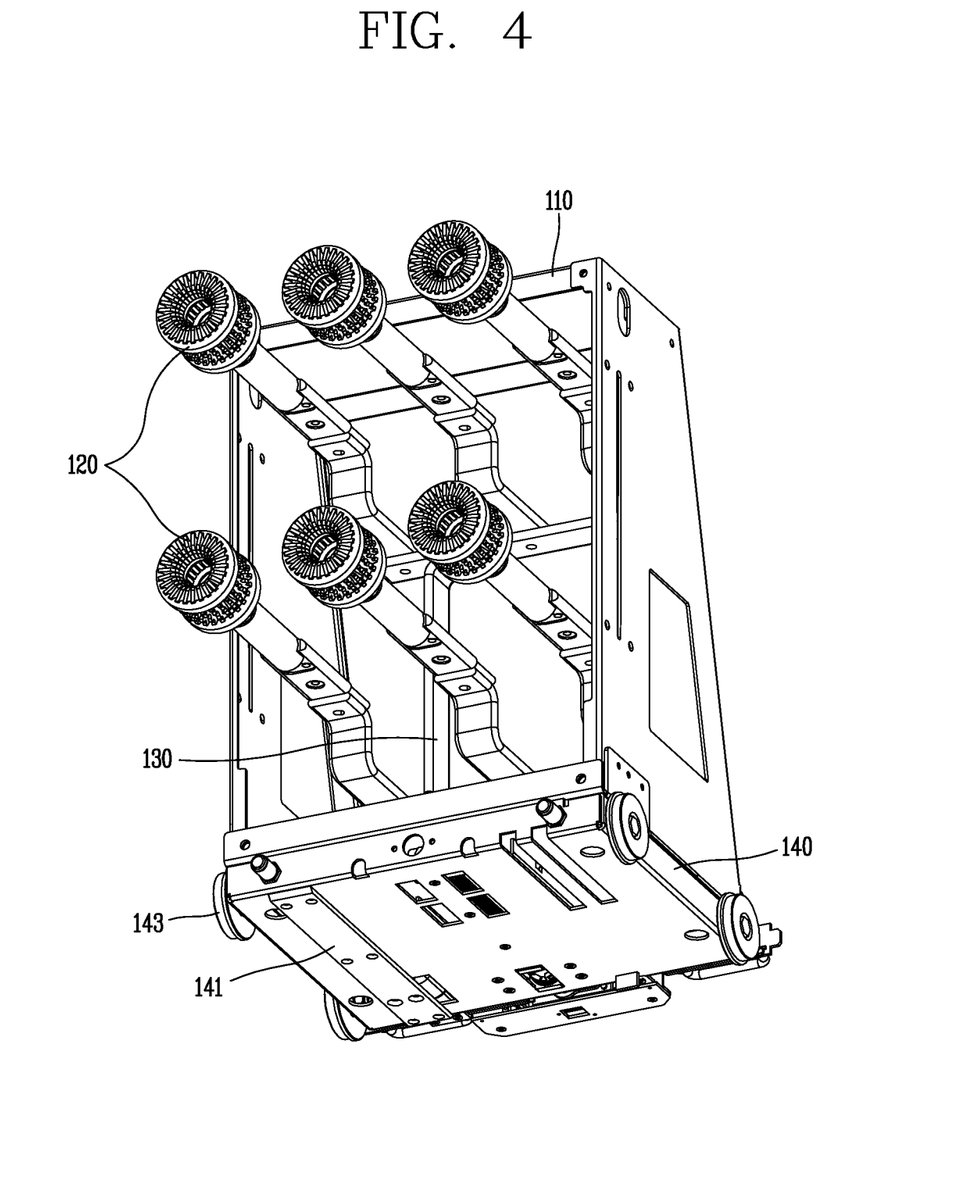
FIG. 4 is a perspective view showing an earthing truck according to the present invention.
Figure 5:
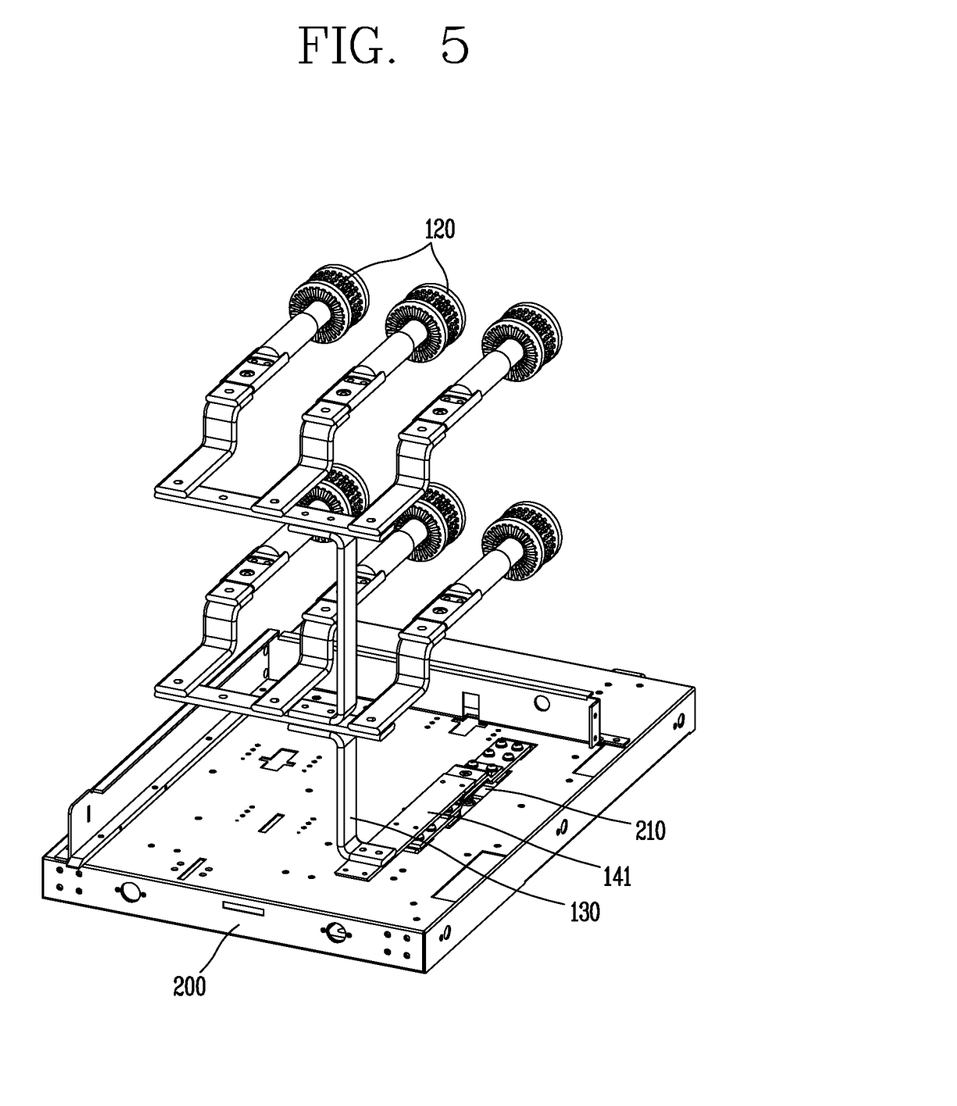
FIG. 5 is a perspective view showing an earthing truck according to the present invention when it is in a test position.
Figure 6:
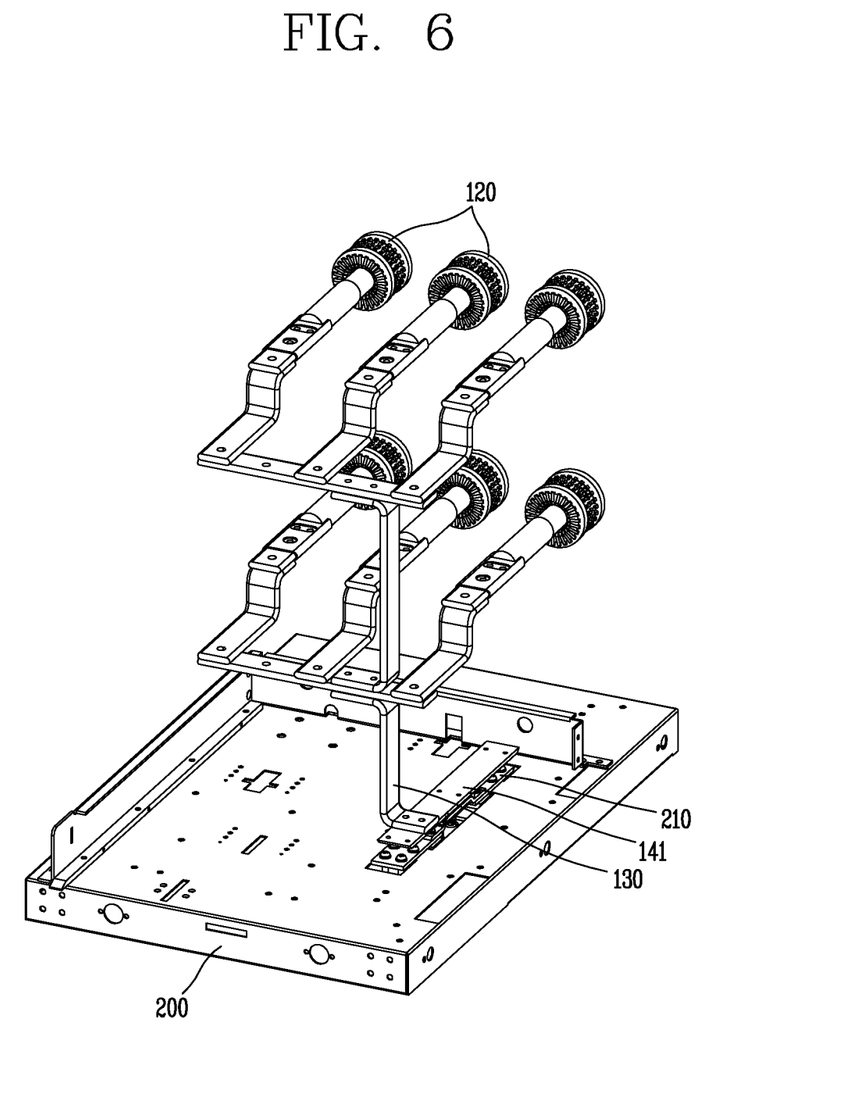
FIG. 6 is a perspective view showing an earthing truck according to the present invention when it is in a service position.

FIG. 3 is a perspective view showing a state in which an earthing truck according to the present invention is provided in a cutoff chamber. FIG. 4 is a perspective view showing an earthing truck according to the present invention. FIG. 5 is a perspective view showing an earthing truck according to the present invention when it is in a test position. FIG. 6 is a perspective view showing an earthing truck according to the present invention when it is in a service position.

Figure 7:
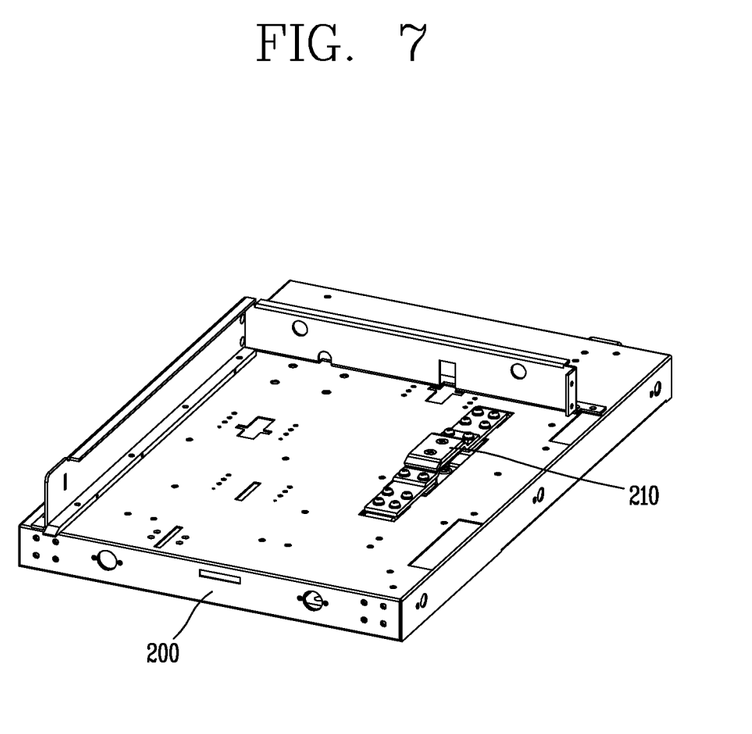
FIG. 7 is a perspective view showing a state in which an earthing member is provided in a cutoff chamber where an earthing truck according to the present invention moves.
Figure 8:
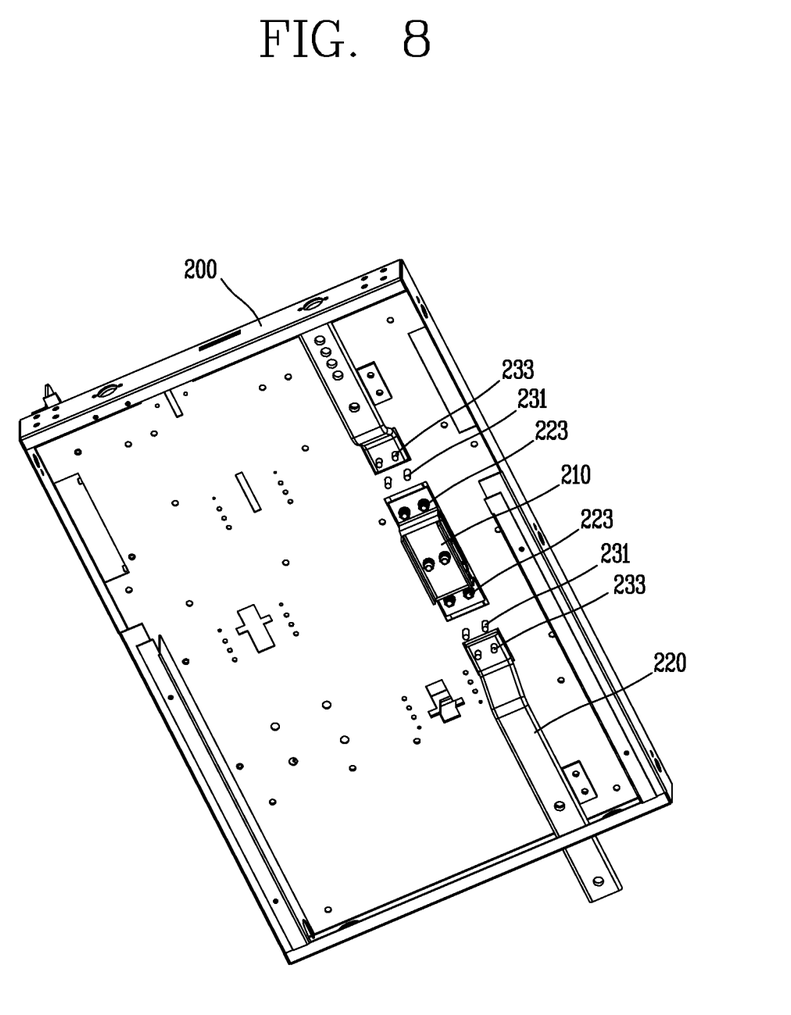
FIG. 8 is another perspective view showing a state in which an earthing member is provided in a cutoff chamber where an earthing truck according to the present invention moves.
Figure 9:
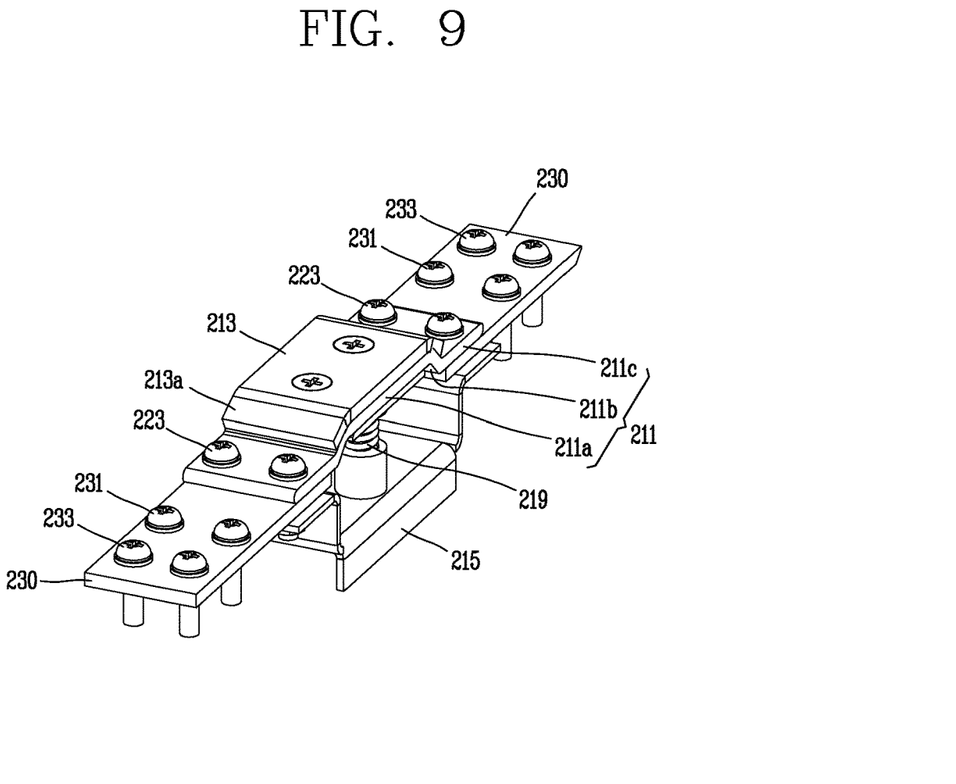
FIG. 9 is a perspective view showing an earthing member of a cutoff chamber including an earthing truck according to the present invention.
Figure 10:
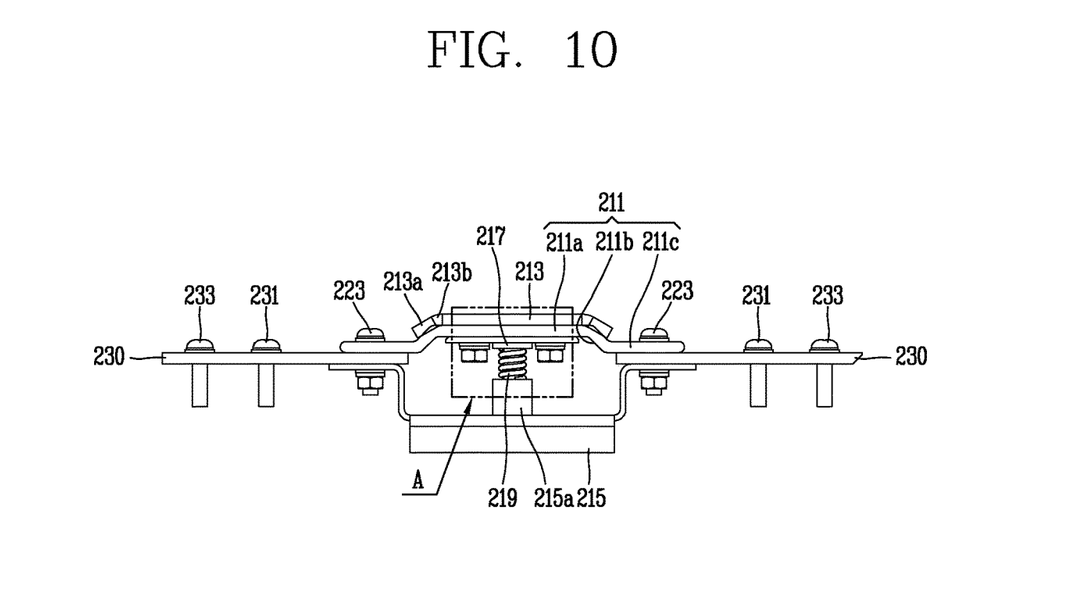
FIG. 10 is a front view showing an earthing member of a cutoff chamber including an earthing truck according to the present invention.
Figure 11:
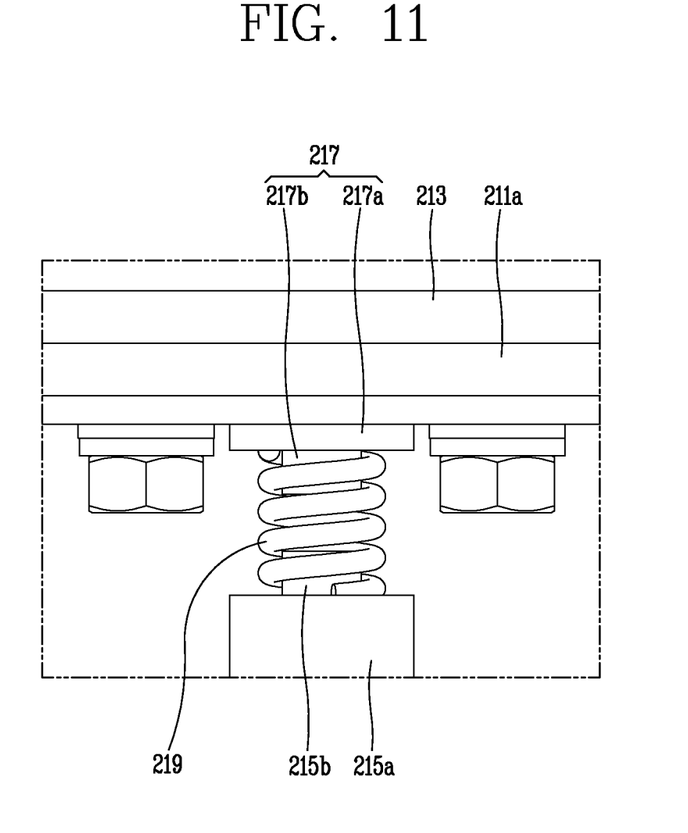
FIG. 11 is an enlarged view of a portion A in FIG. 10.
Figure 12:
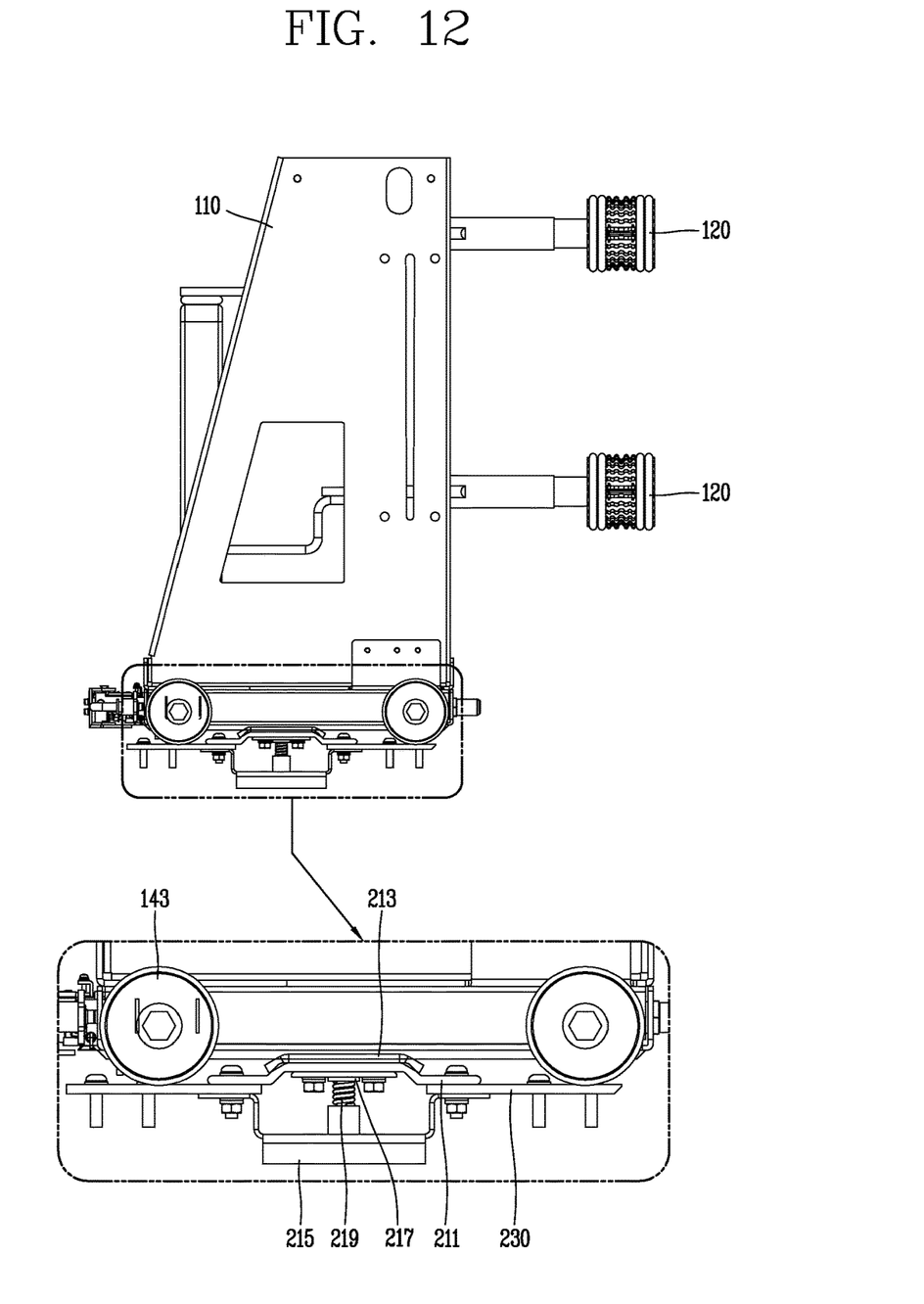
FIG. 12 is a partial enlarged view showing an earthing plate and an earthing member in a state in which an earthing truck according to the present invention is positioned in a cutoff chamber.

FIG. 7 is a perspective view showing a state in which an earthing member is provided in a cutoff chamber where an earthing truck according to the present invention moves. FIG. 8 is another perspective view showing a state in which an earthing member is provided in a cutoff chamber where an earthing truck according to the present invention moves. FIG. 9 is a perspective view showing an earthing member of a cutoff chamber including an earthing truck according to the present invention. FIG. 10 is a front view showing an earthing member of a cutoff chamber including an earthing truck according to the present invention. FIG. 11 is an enlarged view of a portion A in FIG. 10. FIG. 12 is a partial enlarged view showing an earthing plate and an earthing member in a state in which an earthing truck according to the present invention is positioned in a cutoff chamber.

As shown in FIGS. 3 to 6, an earthing truck 100 having an earthing structure according to the present invention grounds the residual current remaining in a bus chamber (not shown) and a cable chamber (not shown) and discharges it to the outside as moving to a test position and a service position in a cutoff chamber (not shown) of a distribution panel (not shown).

At this time, an earthing plate 141 is provided to the earthing truck 100, and an earthing member 210 is provided on the inner bottom surface 200 of the cutoff chamber. When the earthing truck 100 moves inside the cutoff chamber, the earthing plate 141 contacts the earthing member 210 and the bus chamber and the cable chamber are electrically interconnected. Therefore, the residual current in the bus chamber and the cable chamber is discharged to the outside through the earthing member 210.

Moreover, the earthing truck 100 includes a frame 110, a moving part 140, a terminal connection part 120, and an earthing plate 141.

The frame 110 is formed of stainless steel or the like and forms the overall skeleton of the earthing truck 100 and fixes or supports various devices provided in the earthing truck 100.

The moving part 140 is positioned below the frame 110 and allows the earthing truck 100 to move inside the cutoff chamber while fixedly supporting the frame 110.

At this time, a plurality of rotatable wheels 143 are provided below the moving part 140, so that the earthing truck 100 is moved forward or backward in the cutoff chamber by the rotation of the wheel 143.

Further, a plate-shaped earthing plate 141 is provided on the lower surface of the moving part 140 and the earthing member 210 is provided on the bottom surface 200 of the cutoff chamber. As the moving part 140 moves, the earthing plate 141 contacts the earthing member 210 and the terminal connection part 120 and the earthing plate 141 and the earthing member 210 are electrically interconnected. Therefore, the residual current in the bus chamber and the cable chamber is discharged to the outside.

More specifically described, as shown in FIGS. 5 and 6, when the earthing truck 100 is in the test position, each of the terminal connection parts 120 provided in the earthing truck 100 is not coupled to a corresponding terminal connection part (not shown) provided in the bus chamber and the cable chamber. Therefore, even though the earthing plate 141 contacts the earthing member 210 to a certain degree and they are positioned in a close state, the earthing plate 141 is not electrically connected to each other.

At this time, when the earthing truck 100 moves from the test position to the service position through the moving part 140, the terminal connection part 120 is connected to a corresponding terminal connection part provided in the bus chamber or the cable chamber, and after the residual current remaining in the bus chamber or the cable chamber passes through the terminal connection part 120 and the terminal connection bar 130 electrically connected to each of the terminal connection parts 120 and moves to the earthing plate 141 and the earthing member 210, it is discharged to the outside through an external earthing cable (not shown) through an external earthing cable connection board 220 connected to the earthing member 210.

On the other hand, as shown in FIG. 12, when the earthing truck 100 moves inside the cutoff chamber, the earthing plate 141 provided on the lower surface of the moving part 140 is slidably contacts the earthing member 210 provided on the bottom surface 200 of the cutoff chamber, and the earthing member 210 moves downward (about 3.5 mm) while closely contacting the earthing plate 141 and provides a contact pressure to the earthing plate 141 at the same time, so that the earthing truck 100 is fixedly supported.

Therefore, the earthing truck 100 is connected to the earthing member 210 through the earthing plate 141 to discharge the residual current remaining in the bus chamber and the cable chamber to the outside and is fixedly supported while being prevented from being shaken by the contact pressure provided through the earthing member 210.

On the other hand, as shown in FIGS. 7 to 10, the earthing member 210 includes an earthing board 211 and an elastic member 219.

The earthing board 211 is formed by stacking a plurality of copper boards and is positioned on the bottom surface 200 of the cutoff chamber so that when the earthing plate 141 moves as the moving part 140 moves, it moves downward while closely contacting the earthing plate 141.

At this time, the earthing board 211 is formed to be in a flexible state by appropriately adjusting the thickness thereof, so that the earthing plate 141 is bent downward when the earthing board 211 closely contacts it.

The elastic member 219 is formed of a coil spring and is positioned below the earthing board 211. When the earthing board 211 is bent downward through the earthing plate 141, it provides an elastic force upward to provide a contact pressure between the earthing plate 141 and the earthing board 211.

Accordingly, the earthing board 211 compresses the elastic member 219 while bent downward as the earthing plate 141 closely contacts it according to a movement of the moving part 140. The earthing board 211 returns to its original position through the elastic member 219 when the contact with the earthing plate 141 is released according to a movement of the moving part 140.

At this time, the elastic member 219 may be provided with one or a plurality of the elastic members 219 according to the earthing short-time capability required for the earthing member 210.

The earthing short-time capability is the capability for withstanding the repulsive force even if a predetermined level of residual current (fault current) flows for a predetermined time to properly perform the earthing function without being damaged during the flow of the residual current, and when the residual current is increased, increases the number of the elastic members 219 to perform the earthing function properly even if the residual current flows.

Therefore, as the thickness of the earthing board 211 is appropriately adjusted to be in a flexible state and also the number of the elastic members 219 is appropriately adjusted, the movement of the earthing truck 100 becomes easy, and the shaking is prevented through the contact pressure, and the earthing short-time capability is improved with a simpler structure.

On the other hand, the earthing board 211 includes a contact board 211a and an inclined board 211b.

The contact board 211a is positioned horizontally on the bottom surface 200 of the cutoff chamber and thus, when the earthing plate 141 moves according to a movement of the moving part 140, closely contacts the earthing plate 141 and moves downward to compress the elastic member 219.

The inclined board 211b is formed inclined downward from both ends of the contact board 211a, so that it is bent downward when the contact board 211a moves downward.

At this time, a connection plate 211c extending in a horizontal direction and connected to the bus bar 230 for earthing is formed on the inclined board 211b.

Accordingly, the connection plate 211c is connected to the bus bar 230, and the bus bar 230 is connected to an external earthing cable through the external earthing cable connection board 220, thereby grounding the residual current of the bus chamber and the cable chamber to discharge it to the outside.

Besides, at least one earthing board connection hole (not shown) for connection with the bus bar 230 is formed in the connection plate 211c and at least one bus bar connection hole (not shown) is formed in the bus bar 230 to correspond to the earthing board connection hole, so that the earthing board 211 and the bus bar 230 are interconnected as the fastening member 223 such as a bolt penetrates the earthing board connection hole and the bus bar connection hole.

At this time, the bus bar 230 is connected to the cutoff chamber through fastening members 231 and 233 such as bolts and is connected to the earthing cable connection board 220 to be electrically connected to an external earthing cable (not shown).

On the other hand, a breakage prevention member 213 may be further provided at the upper end of the contact board 211a to prevent the breakage when the earthing plate 141 and the earthing board 211 contact.

That is, if the earthing plate 141 directly contacts the earthing board 211, there is a high risk that the earthing board 211 having a thin thickness collides with the earthing plate 141 and is damaged. However, the breakage prevention member 213 is provided at the upper end of the contact board 211a so that the earthing plate 141 closely contacts the breakage prevention member 213 rather than the earthing board 211, thereby preventing the earthing board 211 from being damaged due to the collision between the earthing plate 141 and the earthing board 211.

At this time, a guide board 213a may be formed inclined downward at one end of the breakage prevention member 213, where the earthing plate 141 contacts first while moving.

The guide board 213a is formed to be inclined downward and in contact with the inclined board 211b, so that the impact is minimized when contacting the earthing plate 141 and the force applied to the breakage prevention member 213 through a movement of the earthing plate 141 is delivered to the earthing board 211 without loss.

Further, a round part 213b may be further formed between the breakage prevention member 213 and the guide board 213a.

Therefore, as the earthing plate 141 moves while contacting the guide board 213a, when the connection part between the guide board 213a and the breakage prevention member 213 is in an angular state, the connection part is broken and there is a high risk that the earthing plate 141 is worn through the connection part. However, the round part 213b is formed to prevent the wear and the like from being generated.

On the other hand, as shown in FIG. 11, a first fixing member 215 for fixedly supporting the elastic member 219 upward is provided below the elastic member 219.

Further, a second fixing member 217 for fixedly supporting the elastic member 219 downward is provided on a lower surface of the contact board 211a.

At this time, in relation to the first fixing member 215, a seating part 215a positioned to contact one end of the elastic member 219 and seated and an upper protrusion 215b protruding upward from the seating part 215a, to which one side of the elastic member 219 is inserted and fixed, are formed.

Further, in relation to the second fixing member 217, a connection part 217a positioned on the lower surface of the contact board 211a and connected to the contact board 211a and a lower protrusion 217b protruding downward from the connection part 217a, to which the other side of the elastic member 219 is inserted and fixed, are formed.

Accordingly, in relation to the elastic member 219, in a state where one end is positioned to contact the seating part 215a, one side is inserted into the upper protrusion 215b to be fixedly supported, and in a state where the other end contacts the connection part 217a, the other side is inserted into the lower protrusion 217b to be fixedly supported, thereby elastically supporting the earthing board 211 upward in a state where it is positioned between the first fixing member 215 and the second fixing member 217.

In the case of the present invention configured above, the earthing member 210 is positioned in the cutoff chamber rather than being positioned in the earthing truck 100, thereby simplifying the structure of the earthing truck 100.

Also, since the earthing member 210 is provided in the cutoff chamber instead of the earthing truck 100, each component is prevented from being easily broken when the earthing truck 100 moves in the cutoff chamber.

Additionally, by allowing the earthing truck 100 to receive the contact pressure through the earthing member 210 in a moving or stationary state, the earthing truck 100 is prevented from shaking due to an external impact or being easily released from a movement path during movement.

In addition, by forming the earthing board 211 constituting the earthing member 210 to have a small thickness, the earthing board 211 is bent when it closely contacts the earthing plate 141, and by appropriately adjusting the number of the elastic members 219, the earthing short-time capabilities is improved.

In addition, the breakage prevention member 213 is provided at the upper end of the earthing board 211 to prevent breakage due to the collision of the earthing plate 141 and the earthing board 211 through the breakage prevention member 213.

In addition, as the guide board 213a provided on the breakage prevention member 213 is formed to be inclined downward and also to be in contact with the inclined board 211b, the impact is minimized when the earthing plate 141 and the breakage prevention member 213 collide with each other, and the force applied through the earthing plate 141 is delivered to the earthing member 210 without loss.

As described above, the earthing structure of the earthing truck according to the present invention has an effect that the earthing member is positioned in the cutoff chamber rather than being positioned in the earthing truck, thereby simplifying the structure of the earthing truck.

Also, there is an effect that since the earthing member is provided in the cutoff chamber instead of the earthing truck, the structure of the earthing truck becomes simple, so that each component is prevented from being easily broken when the earthing truck 100 moves in the cutoff chamber.

Additionally, by allowing the earthing truck to receive the contact pressure through the earthing member, there is an effect that the earthing truck is prevented from easily shaking due to an external impact or being easily released from a movement path during movement.

In addition, by forming the earthing board constituting the earthing member to have a small thickness to be in a flexible state, there is an effect that the earthing board is bent when it closely contacts the earthing plate to simplify the earthing structure and improve the earthing short-time capabilities.

In addition, there is an effect that the breakage prevention member is provided at the upper end of the earthing board to prevent breakage due to the collision of the earthing plate and the earthing board through the breakage prevention member.

In addition, there is an effect that as the guide board provided on the breakage prevention member is formed to be inclined and also to be in contact with the inclined board, the impact is minimized when the earthing plate and the breakage prevention member collide with each other, and the force applied through the earthing plate is delivered to the earthing member without loss.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An earthing structure of an earthing truck that comprises a frame with a terminal connection part and a moving part configured to support the frame and that is configured to ground a bus or a cable while the moving part moves, the structure comprising:
    an earthing plate provided on a lower surface of the moving part; and
    an earthing member configured to provide a contact pressure to the earthing plate as the earthing member contacts the earthing plate when the moving part moves,
    wherein the earthing member comprises:

an earthing board configured to move downward through the earthing plate according to a movement of the moving part; and at least one elastic member positioned below the earthing board and configured to provide an elastic force upward when the earthing board moves downward to provide a contact pressure between the earthing plate and the earthing board.

2. The earthing structure of claim 1, wherein the earthing member is installed on a bottom surface of a distribution panel cutoff chamber.

3. The earthing structure of claim 1, wherein the earthing board is formed by stacking a plurality of copper boards.

4. The earthing structure of claim 1, wherein the earthing board compresses the elastic member while bent downward as the earthing plate closely contacts according to a movement of the moving part and the earthing board returns to its original position through the elastic member when the close contact with the earthing plate is released according to a movement of the moving part.

5. The earthing structure of claim 4, wherein the earthing board comprises:

a contact board where the earthing plate closely contacts; and an inclined board formed inclined downward at both ends of the contact board and bent when the earthing plate closely contacts.

6. The earthing structure of claim 5, wherein a connection board extending in a horizontal direction to be connected to a bus bar for earthing is formed on the inclined board.

7. The earthing structure of claim 6, wherein:

a breakage prevention member is provided at an upper end of the contact board to prevent a breakage when the earthing plate and the earthing board contact;

at least one earthing board connection hole for connection with the bus bar is formed in the connection plate; and at least one bus bar connection hole is formed in the bus bar to correspond to the earthing board connection hole, wherein a fastening member penetrates the earthing board connection hole and the bus bar to allow the earthing board and the bus bar to be interconnected.

8. The earthing structure of claim 7, wherein:

a guide board formed inclined downward to contact the inclined board is formed at one end of the breakage prevention member; and a round part is formed between the breakage prevention member and the guide board.

9. The earthing structure of claim 7, wherein a first fixing member for fixedly supporting the elastic member upward is provided below the elastic member.

10. The earthing structure of claim 4, wherein a first fixing member for fixedly supporting the elastic member upward is provided below the elastic member.

11. The earthing structure of claim 10, wherein a second fixing member for fixedly supporting the elastic member downward is provided on a lower surface of the contact board, wherein:

a seating part positioned to contact one end of the elastic member and seated and an upper protrusion protruding upward from the seating part, to which one side of the elastic member is inserted and fixed, are formed on the first fixing member; and a connection part positioned on a lower surface of the contact board and connected to the contact board and a lower protrusion protruding downward from the connection part, to which the other side of the elastic member is inserted and fixed, are formed on the second fixing member.

12. The earthing structure of claim 1, further comprising a terminal connection bar connected to the terminal connection part and the earthing plate to electrically connect the terminal connection part and the earthing plate.

* * * * *